US008464681B2

(12) United States Patent
Matsuo et al.

(10) Patent No.: US 8,464,681 B2
(45) Date of Patent: Jun. 18, 2013

(54) POWER UNIT FOR VEHICLE

(75) Inventors: Kenji Matsuo, Saitama (JP); Masaki Yamazaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 587 days.

(21) Appl. No.: 12/714,184

(22) Filed: Feb. 26, 2010

(65) Prior Publication Data

US 2010/0229814 A1  Sep. 16, 2010

(30) Foreign Application Priority Data

Mar. 12, 2009 (JP) ................................. 2009-060012

(51) Int. Cl.
*F02N 11/08* (2006.01)
(52) U.S. Cl.
USPC .................. 123/179.3; 123/400; 123/179.25; 74/325
(58) Field of Classification Search
USPC .................. 123/179.1, 179.3, 179.4, 179.25, 123/400; 903/904, 909; 477/5, 70; 74/9, 325, 74/473.36, 329, 331, 333
See application file for complete search history.

(56) References Cited

U.S. PATENT DOCUMENTS

| | | | |
|---|---|---|---|
| 7,131,412 B2* | 11/2006 | Tsutsumi et al. | 123/179.25 |
| 7,819,211 B2* | 10/2010 | Fukami et al. | 180/65.26 |
| 8,196,558 B2* | 6/2012 | Okumoto et al. | 123/179.4 |
| 2003/0047156 A1* | 3/2003 | Holweg | 123/179.25 |
| 2005/0039717 A1* | 2/2005 | Tsutsumi et al. | 123/179.25 |
| 2007/0075521 A1* | 4/2007 | Ogasawara et al. | 280/291 |
| 2007/0137602 A1* | 6/2007 | Kassner | 123/179.25 |
| 2007/0199392 A1* | 8/2007 | Mizuno et al. | 74/325 |
| 2008/0066707 A1* | 3/2008 | Berger | 123/179.25 |
| 2008/0243324 A1* | 10/2008 | Harris | 701/22 |
| 2009/0293670 A1* | 12/2009 | Sekira et al. | 74/7 E |
| 2010/0077884 A1* | 4/2010 | Ono et al. | 74/473.36 |
| 2010/0229816 A1* | 9/2010 | Matsuo | 123/179.25 |

FOREIGN PATENT DOCUMENTS

JP  2007-269253 A  10/2007

* cited by examiner

*Primary Examiner* — John T. Kwon
*Assistant Examiner* — Johnny Hoang
(74) *Attorney, Agent, or Firm* — Birch, Stewart, Kolasch & Birch, LLP

(57) ABSTRACT

A vehicle power unit including a speed reducing gear train including a starter driven gear, a starting one-way clutch interposed between the starter driven gear and a crankshaft. The speed reducing gear train and the starting one-way clutch are provided between a starter motor and the crankshaft. A transmission includes gear trains for a plurality of gear speeds wherein the gear trains are provided between a main shaft and a counter shaft. A hybrid type configuration is possible wherein the starter motor produces power for driving the vehicle and to impart a drive assisting force. The starter motor can be changed over between a normal rotational operation and a reverse rotational operation. A power transmission idle gear is interposed between the starter driven gear and a power transmitting gear through a running one-way clutch for permitting power transmission to the side of the main shaft.

20 Claims, 3 Drawing Sheets

POWER UNIT FOR VEHICLE

CROSS-REFERENCE TO RELATED APPLICATIONS

The present application claims priority under 35 USC 119 to Japanese Patent Application No. 2009-060012 filed on Mar. 12, 2009 the entire contents of which are hereby incorporated by reference.

BACKGROUND OF THE INVENTION

1. Field of the Invention

The present invention relates to a vehicle power unit including a speed reducing gear train including a starter driven gear relatively rotatably borne on a crankshaft rotatably borne on a crankcase constituting part of an engine body with a starting one-way clutch interposed between the starter driven gear and the crankshaft so as to permit power transmission from the starter driven gear to the crankshaft side. The speed reducing gear train and the starting one-way clutch being provided between a starter motor mounted to the engine body and the crankshaft with a transmission accommodated in the crankcase. The transmission includes gear trains for a plurality of gear speeds which can be selectively established. The gear trains are provided between a main shaft and a counter shaft which have axes parallel to the crankshaft.

2. Description of Background Art

A hybrid type motorcycle is known wherein an electric motor for exclusive use for imparting a torque to a power transmission system including a crankshaft of an engine mounted on the motorcycle is provided separately from a starter motor for imparting a starting torque to the crankshaft. See, for example, Japanese Patent Laid-Open No. 2007-269253.

However, in the motorcycle disclosed in Japanese Patent Laid-Open No. 2007-269253, the electric motor for exclusive use for imparting a torque to the power transmission system is needed, in addition to the starter motor. Therefore, the number of component parts is increased with an exclusive-use power transmission mechanisms having to be provided, respectively, for the starter motor and for the electric motor. This leads to a complicated structure and an enlarged power unit.

SUMMARY AND OBJECTS OF THE INVENTION

The present invention has been made in consideration of the above-mentioned circumstances. Accordingly, it is an object of an embodiment of the present invention to provide a vehicle power unit configured to be of a hybrid type with a simple structure with a reduction in the number of component parts while making it possible, with a starter motor, to produce vehicle-driving power and to impart a drive-assisting force.

According to an embodiment of the present invention, in a vehicle power unit including a speed reducing gear train including a starter driven gear relatively rotatably borne on a crankshaft rotatably borne on a crankcase constituting part of an engine body, a starting one-way clutch is interposed between the starter driven gear and the crankshaft so as to permit power transmission from the starter driven gear to the side of the crankshaft. The speed reducing gear train and the starting one-way clutch are provided between a starter motor mounted to the engine body and the crankshaft with a transmission accommodated in the crankcase. The transmission includes gear trains for a plurality of gear speeds which can be selectively established with the gear trains being provided between a main shaft and a counter shaft which have axes parallel to the crankshaft, wherein the starter motor can be changed over between a normal rotational operation at the time of imparting a starting torque to the crankshaft through the speed reducing gear train and the starting one-way clutch and a reverse rotational operation at the time when power transmission from the starter driven gear to the side of the crankshaft is cut off by the starting one-way clutch. In addition, a power transmission idle gear meshes with the starter driven gear and the power transmitting gear relatively rotatably borne on the main shaft through a running one-way clutch for permitting power transmission to the side of the main shaft is interposed between the starter driven gear and the power transmitting gear.

According to an embodiment of the present invention, a power transmission change-over mechanism for change-over between power transmission from the crankshaft to the main shaft and cutoff of the power transmission is provided between the crankshaft and the main shaft.

In addition, a first main shaft 44, a first hydraulic clutch 52 corresponds to the power transmission change-over mechanism, and a first-speed gear train G1 and a third-speed gear train G3 correspond to the gear trains.

According to an embodiment of the present invention, the power transmission idle gear is interposed between the starter driven gear, which constitutes part of the speed reducing gear train and is accompanied by the starting one-way clutch interposed between itself and the crankshaft, and the power transmitting gear, which is relatively rotatably borne on the main shaft through the running one-way clutch for permitting power transmission to the side of the main shaft 44, in such a manner that the rotating directions of the power transmitting gear and the starter driven gear are set reverse to each other. Therefore, when the starter motor is put into a normal rotational operation at the time of starting the engine, a starting torque can be imparted to the crankshaft through the speed reducing gear train and the starting one-way clutch. In addition, at the time when driving of the vehicle by the starter motor and power assisting by the starter motor are to be performed, it suffices to put the starter motor into a reverse rotational operation. This results in that the starting one-way clutch does not transmit an output torque of the starter motor to the crankshaft and that the output torque of the starter motor is transmitted to the main shaft through the speed reducing gear train, the power transmission idle gear, the power transmitting gear and the running one-way clutch. Accordingly, the power unit can be configured to be of a hybrid type with a simple structure, without an additional large number of component parts.

According to an embodiment of the present invention, a condition where the vehicle is driven by only the driving force of the starter motor can be realized by setting into the power transmission cutting-off state the power transmission change-over mechanism provided between the crankshaft and the main shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, an embodiment of the present invention will be described below, based on the accompanying drawings.

Figure 1:
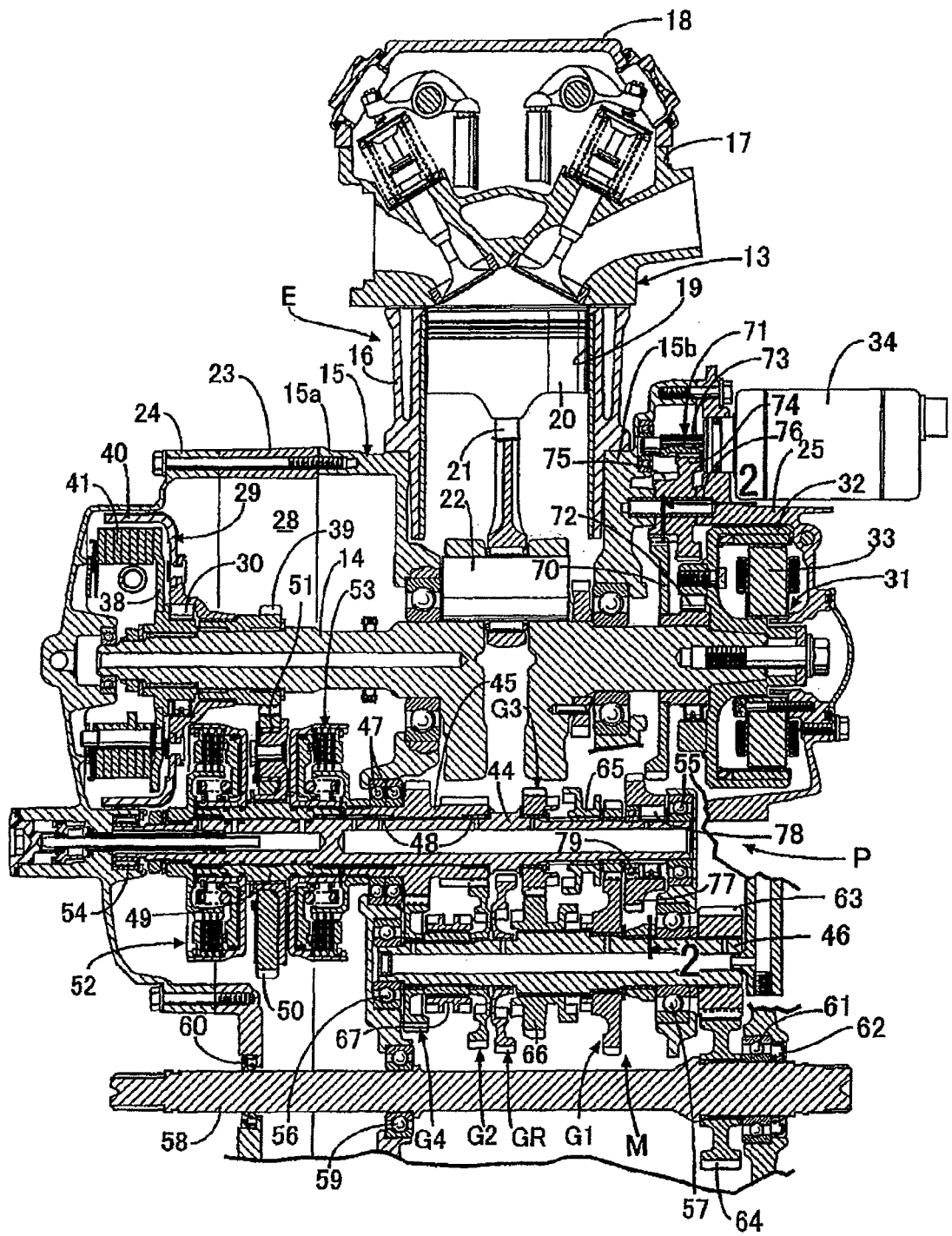
FIG. 1 is a longitudinal sectional view of a power unit.

Referring to FIG. 1, Example 1 of the present invention will be described. This power unit P has an engine E and a transmission M, and is mounted on a vehicle, for example, an all-terrain vehicle (ATV). An engine body 13 of the engine E includes a crankcase 15 for rotatably bearing a crankshaft 14 having an axis set along the front-rear direction, a cylinder 16 connected to an upper portion of the crankcase 15, a cylinder head 17 connected to an upper portion of the cylinder 16, and a head cover 18 connected to an upper portion of the cylinder head 17, wherein a piston 20 slidably fitted in a cylinder bore 19 of the cylinder 16 is connected to the crankshaft 14 through a connecting rod 21 and a crank pin 22.

The crankcase 15 is composed of a pair of case halves 15a and 15b coupled to each other at a plane orthogonal to the rotational axis of the crankshaft 14. First and second crankcase covers 23 and 24 are fastened to one side of the crankcase 15 so that the first crankcase cover 23 is clamped between the second crankcase cover 24 and the case half 15a. A third crankcase cover 25 is fastened to the other side of the crankcase 15. A clutch accommodation chamber 28 is formed between the crankcase 15 and the second crankcase cover 24. The first to third crankcase covers 23, 24 and 25 also constitute part of the engine body 13.

One end of the crankshaft 14 which protrudes from the crankcase 15 is rotatably borne on the second crankcase cover 24. A centrifugal clutch 29 accommodated in the clutch accommodation chamber 28 is mounted to one end portion of the crankshaft 14 at a position close to the second crankcase cover 24, through a one-way clutch 30. A rotor 32 of a generator 31 disposed between the crankcase 15 and the third crankcase cover 25 is connected to another end portion of the crankshaft 14 which protrudes from the crankcase 15, whereas a stator 33 of the generator 31 is fixed to the third crankcase cover 25. In addition, a starter motor 34 is so configured that a normal rotational operation and a reverse rotational operation can be changed over from one to the other and is mounted to the third crankcase cover 25 so as to have a rotational axis parallel to the crankshaft 14.

The centrifugal clutch 29 includes a drive plate 38 fixed to the crankshaft 14, a cup-shaped clutch housing 40 which coaxially covers the drive plate 38 so as to be rotated together with a drive gear 39 relatively rotatably mounted on the crankshaft 14, and a clutch weight 41 turnably borne on the drive plate 38 so as to be capable of frictional engagement with the inner periphery of the clutch housing 40 according to the action of a centrifugal force attendant on the rotation of the crankshaft 14. In addition, a one-way clutch 35 is provided between the clutch housing 40 and the drive plate 38 so as to permit transmission of a back torque from the drive gear 39 to the crankshaft 14.

The transmission M wherein gear trains for a plurality of gear speeds which can be selectively established, for example, a reverse gear train GR and forward gear trains for a plurality of speeds, for instance, first-speed to fourth-speed gear trains G1 to G4 are provided between first and second main shafts 44, 45 and a counter shaft 46, is accommodated in the crankcase 15. The first main shaft 44, the second main shaft 45 and the counter shaft 46 are disposed so as to have respective axes parallel to the crankshaft 14. The first and second main shafts 44 and 45 are coaxially disposed so as to be capable of relative rotation about the same axis. The first-speed gear train G1 and the third-speed gear train G3 are provided between the first main shaft 44 and the counter shaft 46, whereas the second-speed gear train G2, the fourth-speed gear train G4 and the reverse gear train GR are provided between the second main shaft 45 and the counter shaft 46. The reverse gear train GR is composed of a drive gear in the second-speed gear train G2, a reverse idle gear (not shown) having an input-side gear portion meshing with this drive gear, and a driven gear which is rotatably borne on the counter shaft 46 and meshes with an output-side gear portion of the reverse idle gear.

In addition, the first main shaft 44 penetrates, coaxially and in a relatively rotatable manner, the second main shaft 45 which is rotatably borne on the crankcase 15 through ball bearings 47, 47. A plurality of needle bearings 48 are interposed between the second main shaft 45 and the first main shaft 44. In addition, a one-end portion of the first main shaft 44 is rotatably borne on the second crankcase cover 24 through a roller bearing 54, and an other-end portion of the first main shaft 44 is rotatably borne on the crankcase half 15b of the crankcase 15 through a ball bearing 55. Furthermore, a one-end portion of the counter shaft 46 is rotatably borne on the case half 15a of the crankcase 15 through a ball bearing 56, and an other-end portion of the counter shaft 46 penetrates the case half 15b of the crankcase 15 in a rotatable manner, with a ball bearing 57 interposed between the counter shaft 46 and the case half 15b.

In the clutch accommodation chamber 28, a power transmission tubular shaft 49 is relatively rotatably mounted on the first main shaft 44. Rotational power from the crankshaft 14 is transmitted to the power transmission tubular shaft 49 through the centrifugal clutch 29, the drive gear 39, a driven gear 50 meshing with the drive gear 39, and a rubber damper 51. In addition, a first hydraulic clutch 52 as a power transmission change-over mechanism for change-over between power transmission from the crankshaft 14 to the first main shaft 44 and cutoff of the power transmission is provided between the power transmission tubular shaft 49 and the first main shaft 44. In addition, a second hydraulic clutch 53 for change-over between power transmission from the crankshaft 14 to the second main shaft 45 and cutoff of the power transmission is provided between the power transmission tubular shaft 49 and the second main shaft 45.

When the first hydraulic clutch 52 is in a power transmitting state and power is transmitted from the crankshaft 14 to the first main shaft 44, power is transmitted from the first main shaft 44 to the counter shaft 46 through an alternatively established one of the first-speed and third-speed gear trains G1 and G3. When the second hydraulic clutch 53 is in a power transmitting state and power is transmitted from the crankshaft 14 to the second main shaft 45, power is transmitted from the second main shaft 45 to the counter shaft 46 through an alternatively established one of the second-speed, fourth-speed and reverse gear trains G2, G4 and GR.

In addition, a one-side portion of an output shaft 58 connected to a drive wheel (not shown) and having an axis parallel to the rotational axis of the crankshaft 14 penetrates the case half 15a on one side of both the case halves 15a and 15b of the crankcase 15 and the first crankcase cover 23 in a rotatable manner, whereas another-side portion of the output shaft 58 penetrates the third crankcase cover 25 in a rotatable manner. A ball bearing 59 is interposed between the case half 15a and the output shaft 58, an annular seal member 60 is interposed between the first crankcase cover 23 and the output shaft 58, and a ball bearing 61 and an annular seal member 62 are interposed between the third crankcase cover 25 and the output shaft 58.

On the other hand, a drive gear 62 is fixed to an end portion of the counter shaft 46 which protrudes from the case half 15b on the other side of both the case halves 15a and 15b of the crankcase 15, and a driven gear 63 meshing with the drive gear 62 is provided on the output shaft 58. In other words, the counter shaft 46 is connected to the drive wheel through the drive gear 62, the driven gear 63 and the output shaft 58.

A first shifter 65 is borne on the first main shaft 44 in the transmission M in a relatively non-rotatable and axially slidable manner. Second and third shifters 66 and 67 are borne on the counter shaft 46 in a relatively non-rotatable and axially slidable manner. A condition of establishing the first-speed gear train G1, a condition of establishing the third-speed gear train G3 and a condition of establishing the reverse gear train GR can be alternatively changed over by the first and second shifters 65 and 66. A condition of establishing the second-speed gear train G2 and a condition of establishing the fourth-speed gear train G4 can be changed over by the third shifter 67.

A speed reducing gear train 71 including a starter driven gear 70 relatively rotatably borne on the crankshaft 14 and a starting one-way clutch 72 interposed between the starter driven gear 70 and the crankshaft 14 so as to permit power transmission from the starter driven gear 70 to the side of the crankshaft 14 are provided between the starter motor 34, which is mounted to the third crankcase cover 25 of the engine body 13, and the crankshaft 14.

The speed reducing gear 71 is composed of a starter drive gear 73 provided on an output shaft of the starter motor 34, a first idle gear 74 meshing with the starter drive gear 73, a second idle gear 75 formed integrally with the first idle gear 74, and the starter driven gear 70 meshing with the second idle gear 75. Both end portions of a support shaft 76 supporting the first and second idle gears 74 and 75, formed as one body, are supported by the case half 15b of the crankcase 15 and the third crankcase cover 25.

Figure 2:
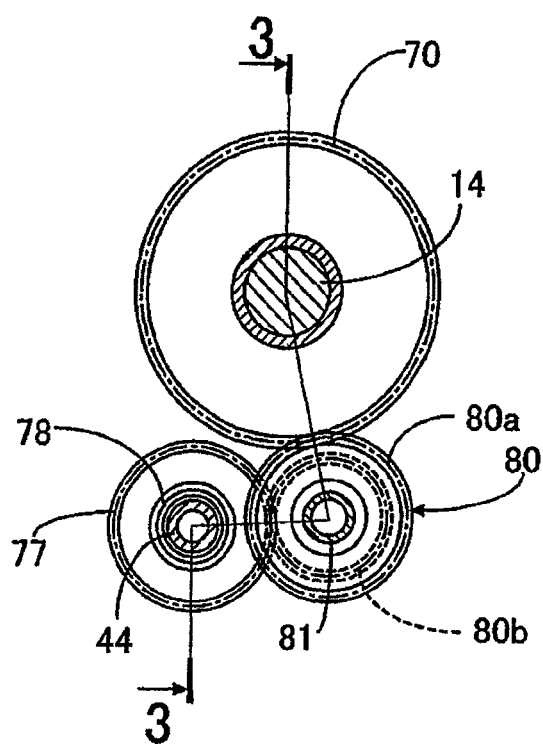
FIG. 2 is a view taken along arrow of line 2-2 of FIG. 1, showing the meshing states of a starter driven gear, a power transmission idle gear and a power transmitting gear.
Figure 3:
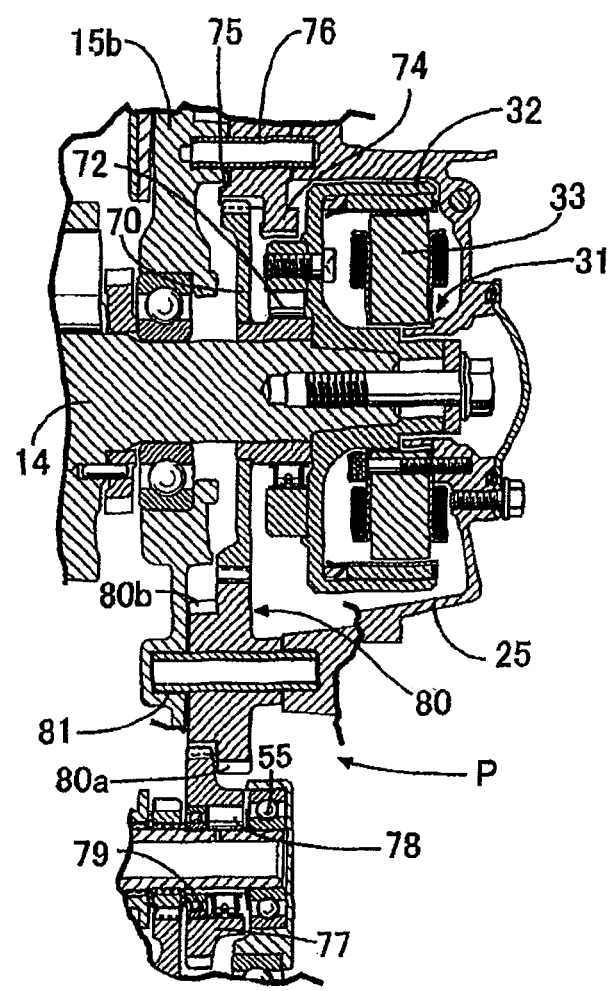
FIG. 3 is a sectional view taken along line 3-3 of FIG. 2.

Referring to FIGS. 2 and 3 together, a power transmitting gear 77 is relatively rotatably borne on the first main shaft 44 in the transmission M through a running one-way clutch 78, for permitting power transmission to the side of the first main shaft 44, and a ball bearing 79. Between the power transmitting gear 77 and the starter driven gear 70 of the speed reducing gear train 71, a power transmission idle gear 80 is interposed which meshes with the power transmitting gear 77 and the starter driven gear 70, in such a manner that the rotating directions of the power transmitting gear 77 and the starter driven gear 70 are set to be reverse to each other.

The power transmission idle gear 80 has a large diameter gear part 80a meshing with the starter driven gear 70, and a small diameter gear part 80b meshing with the power transmitting gear 77, and is rotatably borne on a support shaft 81 provided between the case half 15b of the crankcase 15 and the third crankcase cover 25.

The starter motor 34 is capable of transmitting a rotational torque to the crankshaft 14 through the speed reducing gear train 71 and the starting one-way clutch 72. In addition, the starter motor 34 is capable of transmitting a rotational torque to the first main shaft 44 through the speed reducing gear train 71, the power transmission idle gear 80, the power transmitting gear 77 and the running clutch 78. Furthermore, the starter motor 34 can be changed over between a normal rotational operation at the time of imparting a rotational torque to the crankshaft 14 and a reverse rotational operation at the time when power transmission from the starter driven gear 70 of the speed reducing gear train 71 to the side of the crankshaft 14 is cut off by the starting one-way clutch 72.

The operation of Example 1 will be described below. The starter motor 34 can be changed over between the normal rotational operation at the time of imparting the rotational torque to the crankshaft 14 through the speed reducing gear train 71 and the starting one-way clutch 72 and the reverse rotational operation at the time when the power transmission from the starter driven gear 70 to the side of the crankshaft 14 is cut off by the starting one-way clutch 72. Between the starter driven gear 70 and the power transmitting gear 77 relatively rotatably borne on the first main shaft 44 through a running one-way clutch 78 for permitting power transmission to the side of the first main shaft 44, a power transmission idle gear 80 is interposed which meshes with the starter driven gear 70 and the power transmitting gear 77, in such a manner that the rotating directions of the starter driven gear 70 and the power transmitting gear 77 are set to be reverse to each other.

Therefore, when the starter motor 34 is put into the normal rotational operation at the time of starting the engine E, a starting torque can be imparted to the crankshaft 14 through the speed reducing gear train 71 and the starting one-way clutch 72. In addition, when driving of the vehicle by the starter motor 34 and power assisting by the starter motor are to be performed, it suffices to put the starter motor 34 into the reverse rotational operation. This results in that the starting one-way clutch 72 does not transmit an output torque of the starter motor 34 to the crankshaft 14 and that the output torque of the starter motor 34 is transmitted to the first main shaft 44 through the speed reducing gear train 71, the power transmission idle gear 80, the power transmitting gear 77 and the running one-way clutch 78. Accordingly, the power unit P can be configured to be of a hybrid type with a simple structure, without the addition of a large number of component part.

In addition, since the first hydraulic clutch 52 for change-over between power transmission from the crankshaft 14 to the first main shaft 44 and cutoff of the power transmission is provided between the crankshaft 14 and the first main shaft 44, a condition where the vehicle is driven by only the driving force of the starter motor 34 can be realized by setting the first hydraulic clutch 52 into the power transmission cutting-off state.

The operating conditions of each part of the power unit P from the time of starting the engine E to the time of running of the vehicle will be described sequentially. First, at the time of starting the engine E, the transmission M is set into a neutral state, the first and second hydraulic clutches 52 and 53 are each set into a power transmission cutting-off state, and the starter motor 34 is put into a normal rotational operation. As a result, rotational power from the starter motor 34 is inputted to the crankshaft 14 through the speed reducing gear train 71 and the starting one-way clutch 72. In addition, a rotational torque is also imparted from the starter driven gear 70 to the power transmitting gear 77 through the power transmission idle gear 80. In this case, however, the rotational torque is not transmitted from the power transmitting gear 77 to the first main shaft 44 through the running one-way clutch 78, and the power transmitting gear 77 is only rotated idly.

Next, at the time of idling with the rotating speed of the engine E set at, for example, about 1400 rpm, the operation of the starter motor 34 is stopped while maintaining the condition where the transmission M is in the neutral state and the first and second hydraulic clutches 52 and 53 are in the power transmission cutting-off state.

At the time of performing power assisting by the starter motor 34 in the condition where the rotating speed of the engine E is set in the range of, for example, 1400 to 2400 rpm, the first hydraulic clutch 52 is set in the power transmitting state, a gear train, e.g., the first-speed gear train G1 in the transmission M is established, and, in this condition, the starter motor 34 is put into a reverse rotational operation. As a result, the starting one-way clutch 72 rotates idly without transmitting the rotational power of the starter driven gear 70 to the crankshaft 14, and the rotational power of the starter driven gear 70 is transmitted to the first main shaft 44 through the idle gear 80, the power transmitting gear 77 and the running one-way clutch 78. On the other hand, the rotating speed of the crankshaft 14 becomes higher than the rotating speed of the drive gear 39, so that the one-way clutch 30 does not transmit power between the crankshaft 14 and the drive gear 39, but the centrifugal clutch 29 is put into sliding engagement. Therefore, the rotational power of the crankshaft 14 is transmitted through the centrifugal clutch 29 in the sliding engagement, the drive gear 39, the driven gear 50, the rubber damper 51 and the first hydraulic clutch 52 to the first main shaft 44. Accordingly, the rotational power assisted by the starter motor 34 is transmitted through the first-speed gear train G1 to the counter shaft 46, and is further transmitted through the drive gear 63 and the driven gear 64, to be outputted from the output shaft 58.

When the reverse rotational operation of the starter motor 34 is continued in the condition where the first hydraulic clutch 52 is in the power transmitting state and either of the first-speed and third-speed gear trains G1 and G3 in the transmission M is established during normal operation with the rotating speed of the engine E set at, for example, more than 2400 rpm, the starting one-way clutch 72 does not transmit the rotational power of the starter driven gear 70 to the crankshaft 14, and the rotational power of the starter driven gear 70 is transmitted through the speed reducing gear train 71 and the power transmission idle gear 80 to the power transmitting gear 77. In this case, however, the rotating speed of the first main shaft 44 is higher than the rotating speed of the power transmitting gear 77, and, therefore, the running one-way clutch 78 does not transmit the rotational power from the power transmitting gear 77 to the first main shaft 44.

At the time of not performing the power assisting by the starter motor 34 during the normal operation with the rotating speed of the engine E set at, for example, more than 2400 rpm, it suffices to stop the operation of the starter motor 34. In this case, the running clutch 78 does not transmit power from the first main shaft 44 being rotated by the rotational power, which is transmitted from the crankshaft 14, to the side of the power transmitting gear 77, namely, to the side of the starter motor 34.

Furthermore, at the time of driving the vehicle by only the power supplied from the starter motor 34, the first hydraulic clutch 52 is put into a power transmission cutting-off state, either of the first-speed and third-speed gear trains G1 and G3 in the transmission M is established, and, in this condition, the starter motor 34 is put into a reverse rotational operation. As a result, the rotational power of the starter driven gear 70 is transmitted through the speed reducing gear train 71, the power transmission idle gear 80, the power transmitting gear 77 and the running one-way clutch 78 to the first main shaft 44, and the rotational power transmitted to the counter shaft 46 through either of the first-speed and the third-speed gear trains G1 and G3 is transmitted through the drive gear 63 and the driven gear 64, to be outputted from the output shaft 58.

In this case, since the first hydraulic clutch 52 is in the power transmission cutting-off state, the rotational power of the first main shaft 44 is not transmitted to the side of the crankshaft 14.

While the embodiment of the present invention has been described above, the invention is not limited to the above embodiment, and various design modifications are possible within the scope of the invention as described in the claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle power unit comprising:
   a speed reducing gear train including a starter driven gear relatively rotatably borne on a crankshaft rotatably borne on a crankcase constituting part of an engine body,
   a starting one-way clutch interposed between the starter driven gear and the crankshaft so as to permit power transmission from the starter driven gear to the side of the crankshaft, the speed reducing gear train and the starting one-way clutch being provided between a starter motor mounted to the engine body and the crankshaft;
   a transmission accommodated in the crankcase, the transmission having gear trains for a plurality of gear speeds which can be selectively established, the gear trains being provided between a main shaft and a counter shaft which have axes parallel to the crankshaft;
   said starter motor being selectively changed over between a normal rotational operation at the time of imparting a starting torque to the crankshaft through the speed reducing gear train and the starting one-way clutch and a reverse rotational operation at the time when power transmission from the starter driven gear to the side of the crankshaft is cut off by the starting one-way clutch; and
   a power transmission idle gear meshing with the starter driven gear and the power transmitting gear relatively rotatably borne on the main shaft through a running one-way clutch for permitting power transmission to the side of the main shaft is interposed between the starter driven gear and the power transmitting gear.

2. The vehicle power unit according to claim 1, and further including a power transmission change-over mechanism for change-over between power transmission from the crankshaft to the main shaft and cutoff of the power transmission, said power transmission change-over mechanism being provided between the crankshaft and the main shaft.

3. The vehicle power unit according to claim 1, and further including a first shifter and a second shifter operatively mounted on the main shaft, a condition of establishing a first-speed gear train and a condition of establishing a third-speed gear train and a condition of establishing a reverse gear train are alternatively changed over by the first and second shifters.

4. The vehicle power unit according to claim 3, wherein a condition of establishing a second-speed gear train and a condition of establishing a fourth-speed gear train can be changed over by the third shifter.

5. The vehicle power unit according to claim 1, wherein the speed reducing gear train includes a starter drive gear operatively mounted on an output shaft of the starter motor, a first idle gear meshing with the starter drive gear and a second idle gear wherein the starter driven gear meshes with the second idle gear.

6. The vehicle power unit according to claim 5, wherein the first and second idle gears are formed integrally with each other.

7. The vehicle power unit according to claim 5, and further including a support shaft for mounting the first idle gear and the second idle gear, said support shaft being supported by a case half and a third crankcase cover.

8. The vehicle power unit according to claim 1, said rotational direction of the power transmitting gear and the starter driven gear being set to be reverse relative to each other.

9. The vehicle power unit according to claim 1, said power transmission idle gear including a large diameter gear portion meshing with the starter driven gear and a small diameter gear portion meshing with the power transmitting gear.

10. The vehicle power unit according to claim 1, said starter motor being in a normal rotational operation at the time of starting for imparting a starting torque to the crankshaft through the speed reducing gear train and when operating a vehicle by the starter motor and power assisting by the starter motor the starter motor is placed in the reverse rotational operation the starting one-way clutch does not transmit an output torque of the starter motor to the crankshaft, said output torque of the starter motor is transmitted to the first main shaft through the speed reducing gear, the power transmission idle gear, the power transmitting gear and the running one-way clutch.

11. A vehicle power unit comprising:
a speed reducing gear train including a starter driven gear relatively rotatably mounted on a crankshaft rotatably mounted on a crankcase;
a starting one-way clutch operatively interposed between the starter driven gear and the crankshaft for permitting power transmission from the starter driven gear to the side of the crankshaft, the speed reducing gear train and the starting one-way clutch being provided between a starter motor mounted to the crankcase and the crankshaft;
a transmission accommodated in the crankcase, the transmission having gear trains for a plurality of gear speeds which can be selectively established;
said starter motor being operated in a normal rotational operation at the time of imparting a starting torque to the crankshaft through the speed reducing gear train and the starting one-way clutch and is operated in a reverse rotational operation at the time when power transmission from the starter driven gear to the side of the crankshaft is cut off by the starting one-way clutch; and
a power transmission idle gear meshing with the starter driven gear and the power transmitting gear relatively rotatably borne on the main shaft through a running one-way clutch for permitting power transmission to the side of the main shaft, said power transmission idle gear being interposed between the starter driven gear and the power transmitting gear.

12. The vehicle power unit according to claim 11, and further including a power transmission change-over mechanism for change-over between power transmission from the crankshaft to the main shaft and cutoff of the power transmission, said power transmission change-over mechanism being provided between the crankshaft and the main shaft.

13. The vehicle power unit according to claim 11, and further including a first shifter and a second shifter operatively mounted on the main shaft, a condition of establishing a first-speed gear train and a condition of establishing a third-speed gear train and a condition of establishing a reverse gear train are alternatively changed over by the first and second shifters.

14. The vehicle power unit according to claim 13, wherein a condition of establishing a second-speed gear train and a condition of establishing a fourth-speed gear train can be changed over by the third shifter.

15. The vehicle power unit according to claim 11, wherein the speed reducing gear train includes a starter drive gear operatively mounted on an output shaft of the starter motor, a first idle gear meshing with the starter drive gear and a second idle gear wherein the starter driven gear meshes with the second idle gear.

16. The vehicle power unit according to claim 15, wherein the first and second idle gears are formed integrally with each other.

17. The vehicle power unit according to claim 15, and further including a support shaft for mounting the first idle gear and the second idle gear, said support shaft being supported by a case half and a third crankcase cover.

18. The vehicle power unit according to claim 11, said rotational direction of the power transmitting gear and the starter driven gear being set to be reverse relative to each other.

19. The vehicle power unit according to claim 11, said power transmission idle gear includes a large diameter gear portion meshing with the starter driven gear and a small diameter gear portion meshing with the power transmitting gear.

20. The vehicle power unit according to claim 11, said starter motor being in a normal rotational operation at the time of starting for imparting a starting torque to the crankshaft through the speed reducing gear train and when operating a vehicle by the starter motor and power assisting by the starter motor the starter motor is placed in the reverse rotational operation the starting one-way clutch does not transmit an output torque of the starter motor to the crankshaft, said output torque of the starter motor is transmitted to the first main shaft through the speed reducing gear, the power transmission idle gear, the power transmitting gear and the running one-way clutch.

* * * * *